(12) United States Patent
Imler et al.

(10) Patent No.: US 7,252,112 B1
(45) Date of Patent: Aug. 7, 2007

(54) BREAKAWAY HOSE COUPLING WITH A MAGNETIC CONNECTION

(75) Inventors: David L. Imler, Tipp City, OH (US);
Paul D. Carmack, Tipp City, OH (US);
Robert M. Csortos, Sylvania, OH (US)

(73) Assignee: Catlow, Inc., Tipp City, OH (US)

( * ) Notice: Subject to any disclaimer, the term of this patent is extended or adjusted under 35 U.S.C. 154(b) by 0 days.

(21) Appl. No.: 11/445,417

(22) Filed: Jun. 1, 2006

(51) Int. Cl.
*F16L 29/04* (2006.01)

(52) U.S. Cl. .............................. 137/614.04; 251/149.7; 285/9.1

(58) Field of Classification Search ........... 137/614.04, 137/614.06; 251/149.7; 285/9.1
See application file for complete search history.

(56) References Cited

U.S. PATENT DOCUMENTS

| | | | | |
|---|---|---|---|---|
| 3,586,048 A | * | 6/1971 | Arnold | 137/614.04 |
| 4,049,295 A | * | 9/1977 | Piers | 285/9.1 |
| 4,691,941 A | | 9/1987 | Rabushka et al. | |
| 4,763,683 A | | 8/1988 | Carmack | |
| 5,419,354 A | * | 5/1995 | Krynicki | 137/614.06 |
| 5,433,247 A | | 7/1995 | Guertin | |
| 6,899,131 B1 | | 5/2005 | Carmack et al. | |

* cited by examiner

*Primary Examiner*—Kevin Lee
(74) *Attorney, Agent, or Firm*—Jacox, Meckstroth & Jenkins

(57) ABSTRACT

A breakaway coupling for a fuel supply hose includes a male valve body interfitting with a female valve body for defining a fuel passage, and the valve bodies enclose axially movable spring biased poppet valve members. The valve bodies are connected by a permanent magnetic coupling system which provides for moving the valve bodies from a connected position to a disconnected position in response to a substantial axial tension force on the valve bodies. In one embodiment, the coupling system includes an annular strike member surrounding the fuel passage and a mating annular magnet member supporting a plurality of circumferentially spaced permanent magnets of rare earth materials. In another embodiment, the valve bodies define a vapor return passage with a poppet valve member and disposed either radially outboard or inboard of the fuel passage. The magnetic coupling system also simplifies reconnecting the valve bodies.

19 Claims, 2 Drawing Sheets

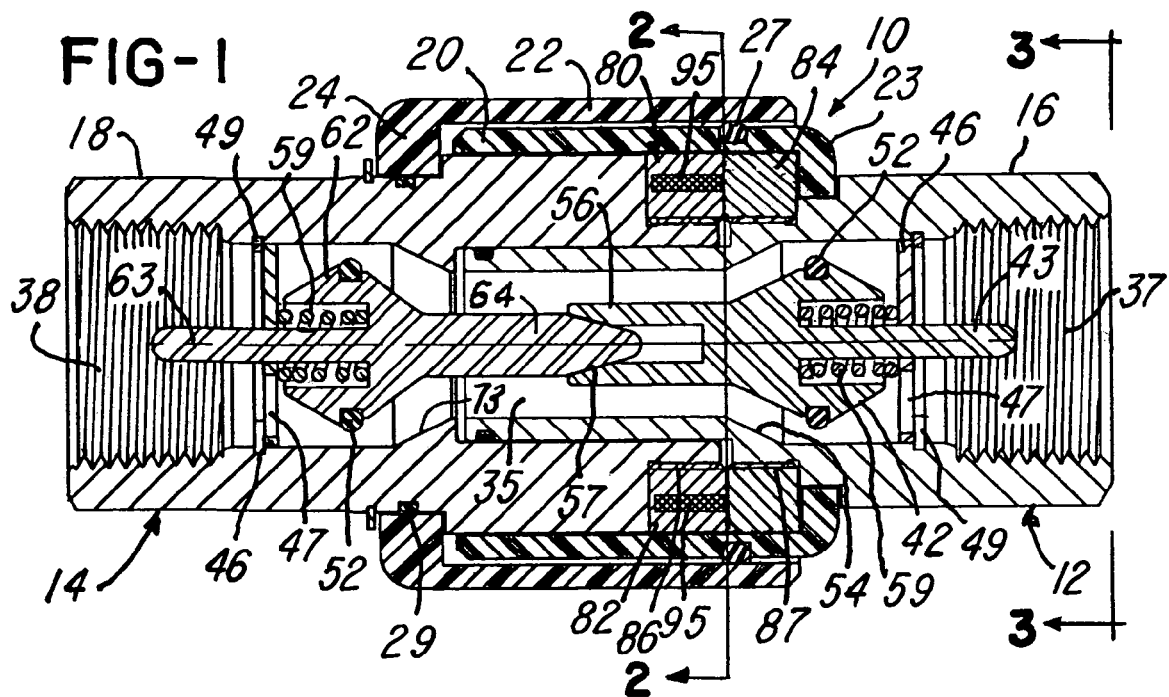
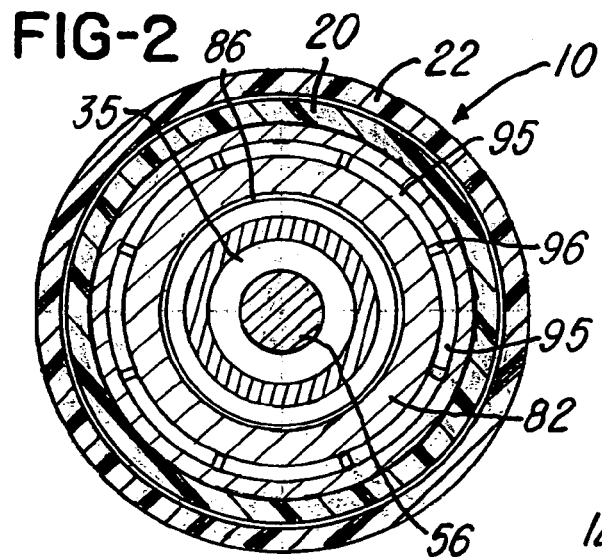
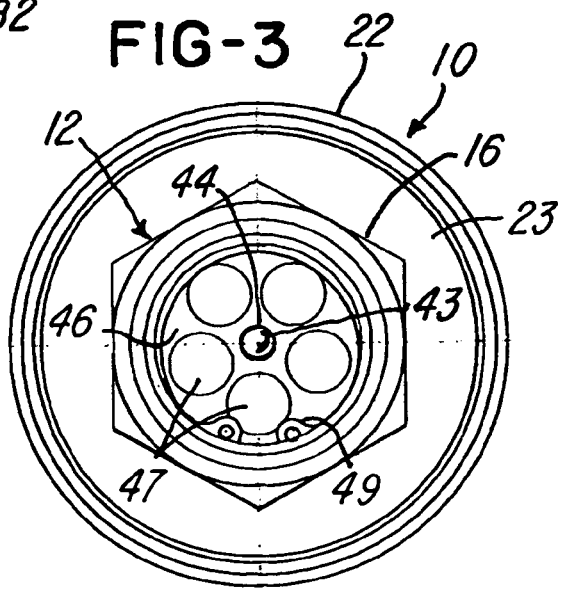

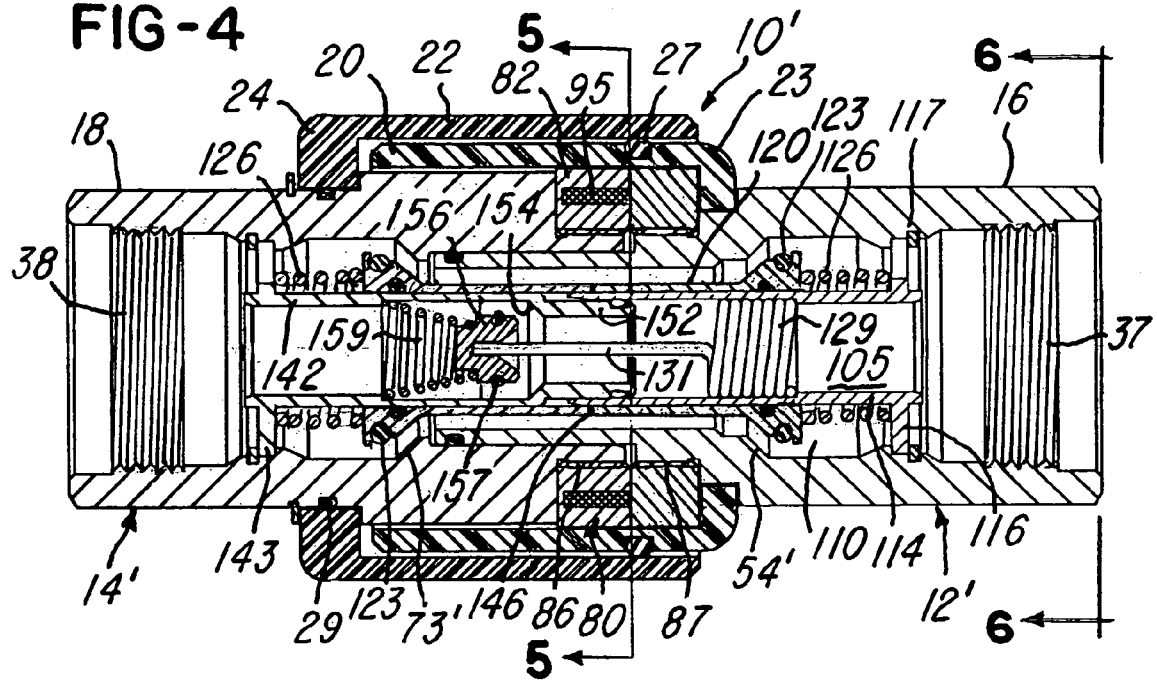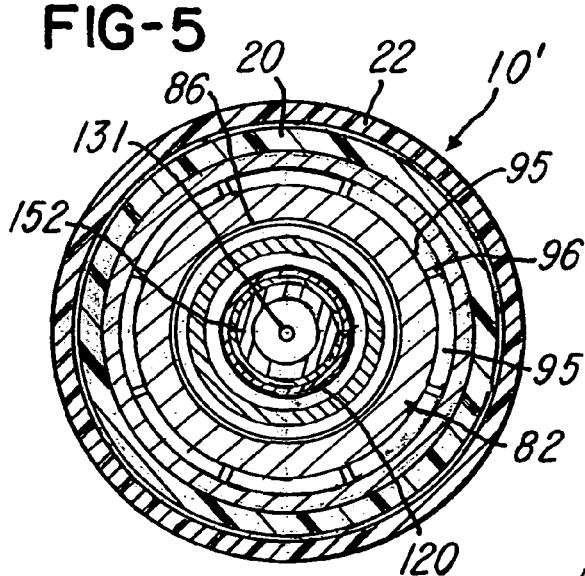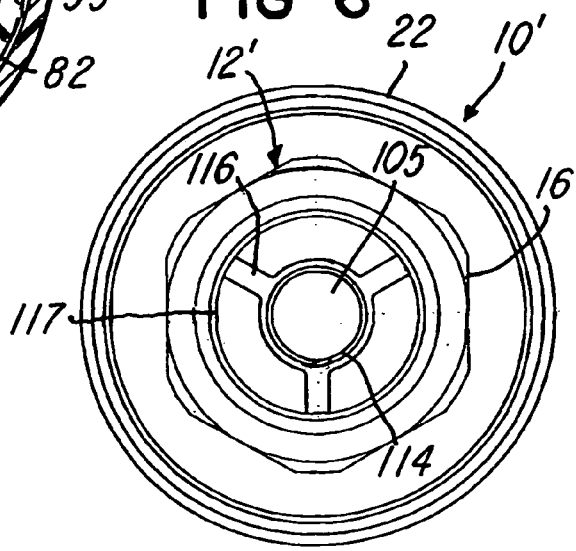

BREAKAWAY HOSE COUPLING WITH A MAGNETIC CONNECTION

BACKGROUND OF THE INVENTION

The present invention relates to a breakaway coupling for a flexible fuel supply hose and of the general type disclosed in U.S. Pat. No. 4,691,941 and in U.S. Pat. No. 4,763,683, U.S. Pat. No. 5,433,247 and U.S. Pat. No. 6,899,131 which issued to the assignee of the present invention and the disclosures of which are herein incorporated by reference. The breakaway coupling may be constructed for a coaxial hose as disclosed in the patents with a fuel supply passage and a vapor return passage both of which have axially moveable valve members for closing the passages in the event the coupling is separated. The present invention also relates to a breakaway coupling having a single fuel supply passage with axially moveable valve members for closing the fuel supply passage in the male and female coupling bodies in the event of separation of the coupling.

In a breakaway hose coupling having a single fuel supply passage or coaxial fuel supply and vapor return passages, the breakaway coupling protects the fuel dispensing equipment from forces which may damage the equipment when separation of the coupling occurs. For example, when a vehicle driver inadvertently forgets to remove the fuel dispensing nozzle from the fuel tank inlet tube and drives away, as discussed in above-mentioned U.S. Pat. No. 4,691,941, the coupling separates when the hose receives a substantial axial tension force, for example, between 200 and 400 pounds. Upon separation, the internal valve members move to their closed positions to prevent the release of fuel from the coupling components and attached hoses.

The female and male coupler bodies are releasably retained together by various means, for example, by a spring biased annular cam pressing against circumferentially spaced balls, as disclosed in above-mentioned U.S. Pat. No. 4,691,941, or by one or more shear pins, as disclosed in above-mentioned U.S. Pat. No. 4,763,683 or by the use of an annular coil spring, such as disclosed in above-mentioned U.S. Pat. No. 5,433,247 and U.S. Pat. No. 6,899,131. While the use of shear pins is the least expensive means for releasably connecting the coupler bodies, trained repair personnel and significant time is required to replace the shear pins after the coupler bodies have been separated. Since the use of the circumferentially spaced balls and a spring biased cam ring results in an expensive connection of the coupler bodies, the use of an annular coil spring has been adopted to reduce the cost of the releasable connection of the coupler bodies and to permit reconnecting the coupler bodies. However, the use of annular coil springs results in variation in the tension force required to separate or pull the coupler bodies apart. In addition, the annular coil spring connection also requires a significant axial compression force to rejoin or reconnect the coupler bodies. It has also been determined that the hydraulic line shock or hammer effect produced in the fuel supply lines or hoses during shut off of the fuel supply by the dispensing nozzles results in wear of the shear pins and coil springs. This wear reduces the tension force required to separate the coupler bodies and thus requires periodic maintenance or replacement of the pins or springs.

SUMMARY OF THE INVENTION

The present invention is directed to an improved breakaway coupling for a flexible fuel supply hose and of the general type described above. The breakaway coupling of the invention provides for separating the coupler bodies with a substantially uniform and constant tension force which may be selected and which greatly simplifies the reconnection or recoupling of the coupler bodies. A coupling constructed in accordance with the invention may also be used with a flexible fuel supply hose with a single fuel passage or with a coaxial fuel supply hose with a vapor return passage which may surround the fuel passage or be located within the fuel passage in order to accommodate a vapor assist fuel dispensing nozzle or a balance-type fuel dispensing nozzle.

In accordance with illustrated embodiments of the invention, a tubular male coupler body and a tubular female coupler body of a breakaway coupling are each provided with internal spring bias poppet valve members for closing the fuel supply passage and any vapor return passage upon separation of the coupler bodies. The coupler bodies are releasably connected in a coupled position by a coupling system including a permanent magnet system which mounts on one coupler body around the fuel supply passage and mates with a strike member which mounts on the other coupler body around the fuel supply passage.

In the illustrated embodiment, the magnet system includes circumferentially spaced magnets formed of rare earth materials, and the magnets are slightly spaced from the annular strike member when the coupler members are connected. Both the magnet system and the strike member are protected after separation of the coupler bodies by interfitting annular protective or cylindrical semi-rigid covers or sleeves. The magnetic coupling system of the invention also provides for conveniently reconnecting or recoupling the coupler bodies.

Other features and advantages of the invention will be apparent from the following description, the accompanying drawings and the appended claims.

BRIEF DESCRIPTION OF THE DRAWINGS

FIG. 1 is an axial section of a breakaway coupling constructed in accordance with the invention and having a fuel supply passage;

FIG. 2 is a radial section of the coupling, taken generally on the line 2-2 of FIG. 1;

FIG. 3 is an end view of the coupling, taken generally on the line 3-3 of FIG. 1, the opposite end view being substantially the same;

FIG. 4 is an axial section of another embodiment of a co-axial breakaway coupling constructed in accordance with the invention and having both a fuel supply passage and a vapor return passage;

FIG. 5 is a radial section of the coupling, taken generally on the line 5-5 of FIG. 4; and FIG. 6 is an end view of the coupling, taken generally on the line 6-6 of FIG. 4.

DESCRIPTION OF THE PREFERRED EMBODIMENTS

FIG. 1 illustrates a breakaway hose coupling 10 which includes a tubular male coupler body or body member 12 and a tubular female coupler body or body member 14 which are formed of a metal such as aluminum and have corresponding hexagonal outer end surfaces 16 and 18, respectively. As shown in FIG. 1, the body members 12 and 14 are in their coupled or connected position and are partially surrounded by interfitting annular or cylindrical sleeves or covers 20 and 22 molded of a semi-rigid plastics material such as nylon. The male cover 20 has an end portion 23 which mounts on the body member 12 against an annular shoulder, and the cover 22 has an end portion 24 which mounts on a cylindrical surface of the body member 14. The inner cover 20 has an external groove which carries a resilient sealing or O-ring 27 which forms a fluid-tight seal between the covers 20 and 22. The body member 14 has an external groove which receives a resilient sealing or O-ring 29 which forms a fluid-tight seal between the body member 14 and the outer cover 22 which is secured by a spring retaining ring.

The body members 16 and 18 define an internal fuel supply passage 35 and have outer end portions within internal threads 37 for receiving threaded fittings, for example, on the end of a short fuel supply hose (not shown) extending from a fuel pump or dispenser and on a fuel supply hose (not shown) extending to a fuel dispensing nozzle. A valve member 42 is supported for axial movement within the center of the fuel supply passage 35 by a guide stem 43 slidably supported within a center hole 44 (FIG. 3) formed within a cylindrical disk or washer 46 having circumferentially spaced openings or holes 47 (FIG. 3). The disk or washer 46 is retained within the body 16 and passage 35 by a spring retaining ring 49. The valve member 42 is constructed as disclosed in above-mentioned U.S. Pat. No. 6,899,131 and has tapered surfaces extending from an annular groove which receives a resilient sealing or O-ring 52 for engaging a tapered valve seat 54 formed within the valve body 12. The valve member 42 also has a tubular inner end portion 56 with a tapered inner end surface 57. A compression coil spring 59 extends within an annular groove within the valve member 42 and engages the supporting disk or washer 46 for normally urging the valve member 42 to a closed position where the sealing ring 52 engages the tapered valve seat 54.

The body member 14 also supports an internal valve member 62 constructed and supported as disclosed also in above-mentioned U.S. Pat. No. 6,899,131. That is, the valve member 62 is supported for axial movement within the center of the fuel passage 35 by a guide stem 63 slidably supported within the center hole 44 of another circular disk or washer 46 having circumferentially spaced holes 47 and secured by another retaining ring 49. The valve member 62 also carries a resilient sealing ring 52 and has an inner center pin portion 64 with a tapered end surface mating with the tapered seat 57. Another compression coil spring 59 extends within an annular groove within the valve member 62 and engages the disk or washer 46 for normally urging the valve member 62 to a closed position where the sealing ring 52 engages a tapered valve seat 73 formed within the body member 14. Preferably, the valve members 42 and 62 are molded of a rigid plastics material such as an acetal and are normally retained in their retracted open positions (FIG. 1) when the body members 12 and 14 are connected together. The operation of the valve members 42 and 62 from open positions (FIG. 1) to closed positions in response to separation of the body members 12 and 14, is the same as disclosed in above-mentioned U.S. Pat. No. 6,899,131.

In accordance with the present invention, the body members 12 and 14 are releasably connected together by a magnetic coupling system 80 which is illustrated in one form by an annular permanent magnetic member 82 and an annular strike member 84 both of which are formed of a plated ferrous material or steel. The members 82 and 84 are secured to their corresponding body members 12 and 14 by internal threads 86 and 87, and the annular strike member 84 has a pair of diametrically opposed and axially extending small holes (now shown) for threadably connecting the strike member 84 to the body member 12 after the end portion 23 of the tubular protective cover 20 is mounted on the body member 12.

As shown in FIG. 2, the annular magnetic member 82 has a plurality of circumferentially spaced arcuate permanent magnets 95 which are recessed within an annular groove 96 formed within the member 82. The arcuate permanent magnets 95 are retained within the groove 96 by an encapsulating film of adhesive or potting and bonding material, for example, as sold under the trademark LOCTITE. Preferably, the magnets 95 are formed of a rare earth material such as neodymium iron boron, and the magnets 95 are arranged with common poles on the inside diameter and common poles on the outside diameter, with small gaps between the magnets. As shown in FIG. 1, the annular groove 96 which receives the magnets 95 does not extend completely through the annular member 82, and the outer edge faces of the arcuate magnets 95 are slightly recessed from the end surface or face of the annular member 82. The recess is preferably on the order of 0.005" to 0.007".

The magnetic attraction between the permanent magnet member 82 and the strike member 84 provides for an attraction of substantial force requiring a tension force greater than 100 pounds to separate or pull the body members 12 and 14 apart. Preferably, the attraction force requires over 200 pounds and on the order of about 240 pounds of tension force to separate the body members 12 and 14. After the body members 12 and 14 have been separated as a result of the axial tension force, it is apparent that the magnetic coupling system 80 provides for conveniently reconnecting the body members with only a small force to overcome the forces exerted by the springs 59 and the O-ring friction when the body member 12 is inserted into the body member 14. The magnetic attraction then pulls the body members together. The force required to separate the body members may be selected by increasing or decreasing the small recess space between the outer ends of the magnets 95 and the end surface of the member 82 and/or increasing or decreasing the thickness of the wall at the bottom of the groove which receives the magnets 95 or by perforating the bottom wall.

FIGS. 4-6 illustrate another embodiment or modification of the breakaway coupling as described above in FIGS. 1-3 and which has similar components as the breakaway coupling 10. Accordingly, the similar components are identified with the same reference numbers but with the addition of prime marks. The breakaway coupling 10' is of the inverted type, that is, has a center vapor return passage 105 surrounded by an annular fuel passage 110. The coupling 10' includes a male body member 12' and female body member 14'. The body member 12' supports a concentric inner tube 114 having peripherally spaced positioning spokes or ribs 116 (FIG. 6) engaging a shoulder within the valve body 12' and secured by a retaining ring 117. The innertube 114 supports an axially slidable tubular valve member 120 which carries a resilient sealing O-ring 123. A compression coil spring 126 urges the valve member 120 towards a closed position where sealing ring 123 engages the annular tapered valve seat 54'. The inner tube 114 also supports an inner tubular wire coil 129 having an axially extending straight end portion or pin 131 within the center of the tube 114.

The coupler body member 14' also supports a center tube 142 which has radially outwardly projecting spokes or ribs 143 engaging a shoulder within the body member 14' and retained by another spring-type retaining ring 117. The center tube 142 also supports an axially slidable valve member 120 which carries a resilient O-ring seal 123 for engaging the annular tapered valve seat 73' within the body member 14'. Another compression spring 126 urges the valve member 120 towards its closed position, and the two valve members 120 have opposing end surfaces which engage at 146 to hold the valve members 120 in their open positions when the body members 12' and 14' are coupled together, as shown in FIG. 4. The center tube 142 has a cylindrical inner end portion 152 which projects into the inner end portion of the center tube 114 and also forms an annular tapered inner valve seat 154.

A valve member 156 has a center hole which normally receives the inner end portion of the pin 131 and carries a resilient O-ring seal 157 for engaging the valve seat 154. A tapered compression wire spring 159 urges the valve member 156 towards its closed position. Thus when the coupler body members 12' and 14' are separated, the valve members 120 move to their closed positions to close the fuel supply passage 110 in both body members, and the valve member 156 moves to its closed position for closing the inner vapor return passage 105 within the coupler body member 14'. Thus the operation of the valve members within the coupler bodies 12' and 14' is substantially the same as disclosed in connection with FIG. 9 of applicant's U.S. patent application No. 2005-0263193-A1, published Dec. 1, 2005 and assigned to the assignee of the present invention. The full disclosure of this published patent application is herein incorporated by reference, and the manual rotational separation of the breakaway hose coupling as disclosed in that application may also be incorporated in the hose coupling of the present invention.

The coupler bodies 12' and 14' are releasably connected together by the same magnetic coupling system 80 as described above in connection with FIGS. 1-3. Accordingly, the same reference numbers are used in FIGS. 4-6 to identify the same components of the magnetic coupling system 80 as described above in connection with FIGS. 1-3. As apparent, the magnetic coupling system 80 may also be used for releasably connecting the tubular coupler bodies of a breakaway coupling of the balanced type, for example, as disclosed in above-mentioned U.S. Pat. No. 4,763,683. In this type of coupling, the fuel vapor within a motor vehicle fuel tank is displaced by the incoming fuel and is directed back to the fuel dispensing pump or dispenser through an annular outer vapor passage surrounding the inner fuel supply passage both within the coupling and each connected co-axial hose.

From the drawings and the above description, it is apparent that a breakaway hose coupling constructed in accordance with the invention, provides desirable features and advantages. For example, the magnetic coupling system 80 provides for releasably securing the tubular coupler bodies together with substantial force so that over 100 pounds and preferably over 200 pounds of axial tension force is required to separate the coupler bodies. This coupling force remains substantially constant over time and is not subjected to wear. The magnetic coupling system also provides for conveniently and quickly reconnecting coupling body members together with only a small axial force required to overcome the forces exerted by the compression springs on the valve members and the friction produced by the resilient O-rings between the coupling members and between the cover members. It is also apparent that when the coupler bodies are separated, the surrounding cover 22 protects the magnet member 80, and the cover 20 protects the strike member 84 as well as the tubular inner portion of the male coupler body. While the arcuate rare earth magnets 95 provide the desired substantial magnetic attraction force while minimizing the overall diameter, it is apparent that other forms of permanent magnets may be used, for example, as known in the art of permanent magnets formed of rare earth materials.

While the forms of coupling herein described constitute preferred embodiments of the invention, it is to be understood that the invention is not limited to these precise forms of couplings, and that changes may be made therein without departing from the scope and spirit of the invention as defined in the appended claims.

The invention claimed is:

1. A breakaway coupling adapted for use with a flexible fuel supply hose having a fuel supply passage, said coupling comprising a first body member and a second body member coupled together and defining a fuel supply passage with an axis, at least one axially movable valve member within at least one of said body members and movable between an open position and a closed position relative to said passage, a coupling system releasably connecting said body members and providing for movement of said body members from a coupled position to an uncoupled position in response to a substantial axial tension force on said valve bodies, said coupling system including a permanent magnet unit mounted on said first body member, a strike member mounted on said second body member, said magnet unit including an annular ferrous metal magnet member surrounding said fuel supply passage and receiving a permanent magnet, said magnet member is threadably connected to said first body member, and said magnet unit attracting said strike member in said coupled position with an axial force sufficient to require an axial tension force of at least one hundred pounds to separate said body members to said uncoupled position.

2. A breakaway coupling adapted for use with a flexible fuel supply hose having a fuel supply passage, said coupling comprising a first body member and a second body member coupled together and defining a fuel supply passage with an axis, at least one axially movable valve member within at least one of said body members and movable between an open position and a closed position relative to said passage, a coupling system releasably connecting said body members and providing for movement of said body members from a coupled position to an uncoupled position in response to a substantial axial tension force on said valve bodies, said coupling system including a permanent magnet unit mounted on said first body member, a strike member mounted on said second body member, said magnet unit attracting said strike member in said coupled position with an axial force sufficient to require an axial tension force of at least one hundred pounds to separate said body members to said uncoupled position, an annular first cover member having an end portion mounted on said first body member, an annular second cover member having an end portion mounted on said second body member, and one of said cover members surrounds the other of said cover members in telescopic relation.

3. A coupling as defined in claim 2 wherein said magnet unit comprises a plurality of circumferentially spaced permanent magnets disposed around said fuel supply passage, and said magnets comprise rare earth materials.

4. A coupling as defined in claim 3 and including an annular ferrous metal member supporting said plurality of permanent magnets.

5. A coupling as defined in claim 3 wherein each of said permanent magnets is arcuate.

6. A coupling as defined in claim 2 wherein said strike member comprises an annular ferrous metal strike member secured to said second body member.

7. A coupling as defined in claim 2 wherein said cover members comprise cover members of substantially rigid plastics material, and a sealing ring between said cover members.

8. A coupling as defined in claim 2 wherein said body members also surround a vapor return passage, and a spring biased valve member within said vapor return passage within one of said body members.

9. A breakaway coupling adapted for use with a flexible fuel supply hose having a fuel supply passage, said coupling comprising a first body member and a second body member coupled together and defining a fuel supply passage with an axis, at least one axially movable valve member within at least one of said body members and movable between an open position and a closed position relative to said passage, a coupling system releasably connecting said body members and providing for movement of said body members from a coupled position to an uncoupled position in response to a substantial axial tension force on said valve bodies, said coupling system including an annular permanent magnet unit mounted on said first body member concentrically with said axially movable valve member, an annular ferrous strike member mounted on said second body member concentrically with said axially movable valve member, said magnet unit including a substantially cylindrical array of separate arcuate permanent magnets each having an axial length substantially greater than its radial thickness relative to said axis, said cylindrical array of magnets extending around said axially movable valve member and confined between an annular outer ferrous member and an annular inner ferrous member having corresponding end surfaces adjacent said annular ferrous strike member to complete a magnetic circuit when said body members are in said coupled position, and said magnet unit attracting said strike member in said coupled position with an axial force sufficient to require an axial tension force of at least one hundred pounds to separate said body members to said uncoupled position.

10. A coupling as defined in claim 9 wherein said permanent magnet unit is threadably connected to said first body member.

11. A coupling as defined in claim 9 and wherein said magnets comprise rare earth materials.

12. A coupling as defined in claim 9 and including an annular first cover member having an end portion mounted on said first body member, an annular second cover member having an end portion mounted on said second body member, and one of said cover members surrounds the other of said cover members in telescopic relation.

13. A coupling as defined in claim 12 wherein said cover members comprise substantially rigid plastics material, and a sealing ring between said cover members.

14. A coupling as defined in claim 9 wherein said body members also define a vapor return passage, and a spring biased valve member within said vapor return passage in one of said body members.

15. A coupling as defined in claim 9 wherein said annular ferrous strike member has a radial thickness substantially equal to a radial thickness of said magnet unit.

16. A coupling as defined in claim 9 wherein said annular ferrous strike member has an axial length substantially equal to an axial length of said magnet unit.

17. A coupling as defined in claim 9 wherein said annular outer ferrous member and said annular inner ferrous member are integrally connected by an end wall cooperating with said inner and outer ferrous members to define an annular groove receiving said arcuate permanent magnets.

18. A coupling as defined in claim 9 wherein said permanent magnets comprise eight arcuate magnets each including neodymium iron boron.

19. A coupling as defined in claim 9 wherein each of said arcuate permanent magnets has an axial length substantially equal to an axial length of said outer ferrous member.

\* \* \* \* \*